(12) United States Patent
Sameshima et al.

(10) Patent No.: US 7,529,613 B2
(45) Date of Patent: May 5, 2009

(54) CONTROLLER FOR INTERNAL COMBUSTION ENGINE

(75) Inventors: Tooru Sameshima, Kariya (JP); Toshiki Annoura, Nagoya (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 11/798,993

(22) Filed: May 18, 2007

(65) Prior Publication Data

US 2007/0294022 A1    Dec. 20, 2007

(30) Foreign Application Priority Data

Jun. 16, 2006    (JP)    ............... 2006-166934

(51) Int. Cl.
*G06F 7/70* (2006.01)
*G01L 3/26* (2006.01)

(52) U.S. Cl. .................. 701/102; 701/103; 73/114.17

(58) Field of Classification Search ............. 701/101, 701/102, 103, 104, 114, 115; 73/114.16, 73/114.17

See application file for complete search history.

(56) References Cited

U.S. PATENT DOCUMENTS

| | | | | |
|---|---|---|---|---|
| 6,457,353 B1 * | 10/2002 | Kanke et al. | ............. | 73/114.42 |
| 7,117,725 B2 * | 10/2006 | Okubo et al. | ............ | 73/114.21 |
| 2008/0072751 A1 * | 3/2008 | Sawada et al. | ................ | 92/172 |

FOREIGN PATENT DOCUMENTS

| | | |
|---|---|---|
| JP | 58-195048 | 11/1983 |
| JP | 62-85148 | 4/1987 |
| JP | 62-152051 | 9/1987 |
| JP | 3427452 | 5/2003 |
| JP | 2004-257316 | 9/2004 |

OTHER PUBLICATIONS

Japanese Official Action dated Sep. 1, 2008, issued in counterpart Japanese Application No. 2006-166934 with English translation.

* cited by examiner

*Primary Examiner*—John T Kwon
(74) *Attorney, Agent, or Firm*—Nixon & Vanderhye PC

(57) ABSTRACT

A controller for an internal combustion engine is disclosed that includes an intake control valve adjusting a flow of intake air in the internal combustion engine and controls a position of the intake control valve in accordance with an engine operating condition. The controller includes an in-cylinder pressure detector for detecting an in-cylinder pressure in the internal combustion engine. The controller also includes a gravity position calculator for calculating a gravity position of a total heat generation amount during a combustion period based upon the detected in-cylinder pressure. Additionally, the controller includes an opening correcting unit for correcting a position of the intake control valve based upon the calculated gravity position of the total heat generation amount. A process for controlling the intake control valve is also disclosed.

10 Claims, 7 Drawing Sheets

FIG. 8

| GRAVITY POSITION θ50 OF TOTAL HEAT GENERATION AMOUNT | 10 | 20 | 30 | 40 | 50 | 60 | 70 | 80 | 90 |
|---|---|---|---|---|---|---|---|---|---|
| IGNITION TIMING CORRECTION AMOUNT B | $-\delta$ | $-\gamma$ | $-\beta$ | $-\alpha$ | 0 | $+\alpha$ | $+\beta$ | $+\gamma$ | $+\delta$ | ic
CONTROLLER FOR INTERNAL COMBUSTION ENGINE

CROSS REFERENCE TO RELATED APPLICATION

This application is based on Japanese Patent Application No. 2006-166934 filed on Jun. 16, 2006, the disclosure of which is incorporated herein by reference in its entirety.

TECHNICAL FIELD

The following generally relates to a controller and, more specifically, relates to a controller for an internal combustion engine which controls an opening of an intake control valve in accordance with an operating condition of the internal combustion engine.

BACKGROUND INFORMATION

A conventional vehicle internal combustion engine is, as described in Japanese Patent No. 3427452-B2, provided with an intake control valve located in an intake passage of the engine for adjusting a flow of intake air. The opening of the intake control valve is controlled in three stages in accordance with an engine operation condition such as engine rotational speed and/or engine load. As a result, strength of a swirl flow or a tumble flow generated in a cylinder of the engine is adjusted in accordance with an engine operating condition to stabilize the combustion state in the cylinder.

In addition, as shown in Japanese Unexamined Patent Publication No. JP-62-85148A, an internal combustion engine is provided with an in-cylinder pressure sensor located in each cylinder thereof. A combustion period of the engine is calculated based upon an in-cylinder pressure detected by the in-cylinder pressure sensor to determine a swirl ratio correction amount based upon the combustion period, an engine rotational speed and an intake air amount. An opening of the intake control valve (i.e., swirl control valve) is corrected by using the swirl ratio correction amount.

In the technology described in Japanese Patent No. 3427452-B2, however, the opening of the intake control valve is simply switched in accordance with an engine rotational speed and an engine load. Therefore, the strength of the swirl flow or the tumble flow may be reduced due to opening variation of the intake control valve because of dimension variation of the intake control valve, play of a gear in a drive portion thereof, or the like, thus deteriorating the combustion state. Even upon occurrence of such deterioration of the combustion state, it is difficult to correct the combustion state with the conventional technology.

In addition, in the technology described in Japanese Unexamined Patent Publication No. JP-62-85148A, a combustion period is calculated based upon an in-cylinder pressure detected by the in-cylinder pressure sensor and a swirl ratio correction amount based upon the combustion period and an engine operating condition (rotational speed or intake air amount) is used to correct an opening of the intake control valve. That is, the combustion period is used as a parameter for evaluating a combustion state of the engine. On the other hand, a combustion period varies with an engine operating condition (rotational speed or load). Therefore, for correcting an opening of the intake control valve in without influence of the engine operating condition, the correction amount of the opening in the intake control valve is calculated based upon the combustion period and the engine operating condition (rotational speed or intake air amount). This results in complication of calculation processing at the time of correcting the opening of the intake control valve, thereby increasing a calculation load of a controller.

In view of the above, there exists a need for a controller for an internal combustion engine which overcomes the above mentioned problems in the conventional art. The present disclosure addresses this need in the conventional art as well as other needs, which will become apparent to those skilled in the art.

SUMMARY

A controller for an internal combustion engine is disclosed that includes an intake control valve adjusting a flow of intake air in the internal combustion engine and controls a position of the intake control valve in accordance with an engine operating condition. The controller includes an in-cylinder pressure detector for detecting an in-cylinder pressure in the internal combustion engine. The controller also includes a gravity position calculator for calculating a gravity position of a total heat generation amount during a combustion period based upon the detected in-cylinder pressure. Additionally, the controller includes an opening correcting unit for correcting a position of the intake control valve based upon the calculated gravity position of the total heat generation amount.

A process is also disclosed for controlling an intake control valve of an internal combustion engine that adjusts a flow of intake air in the internal combustion engine. The process includes detecting an in-cylinder pressure in the internal combustion engine. The process further includes calculating a gravity position of a total heat generation amount during a combustion period based upon the detected in-cylinder pressure. Moreover, the process includes correcting a position of the intake control valve based upon the calculated gravity position of the total heat generation amount.

BRIEF DESCRIPTION OF THE DRAWINGS

Other objects, features, and advantages will become more apparent from the following detailed description made with reference to the accompanying drawings, in which like parts are designated by like reference numbers and in which:

FIG. 8 is a conceptual diagram showing one embodiment of a map of an ignition timing correction amount.

DETAILED DESCRIPTION

Figure 1:
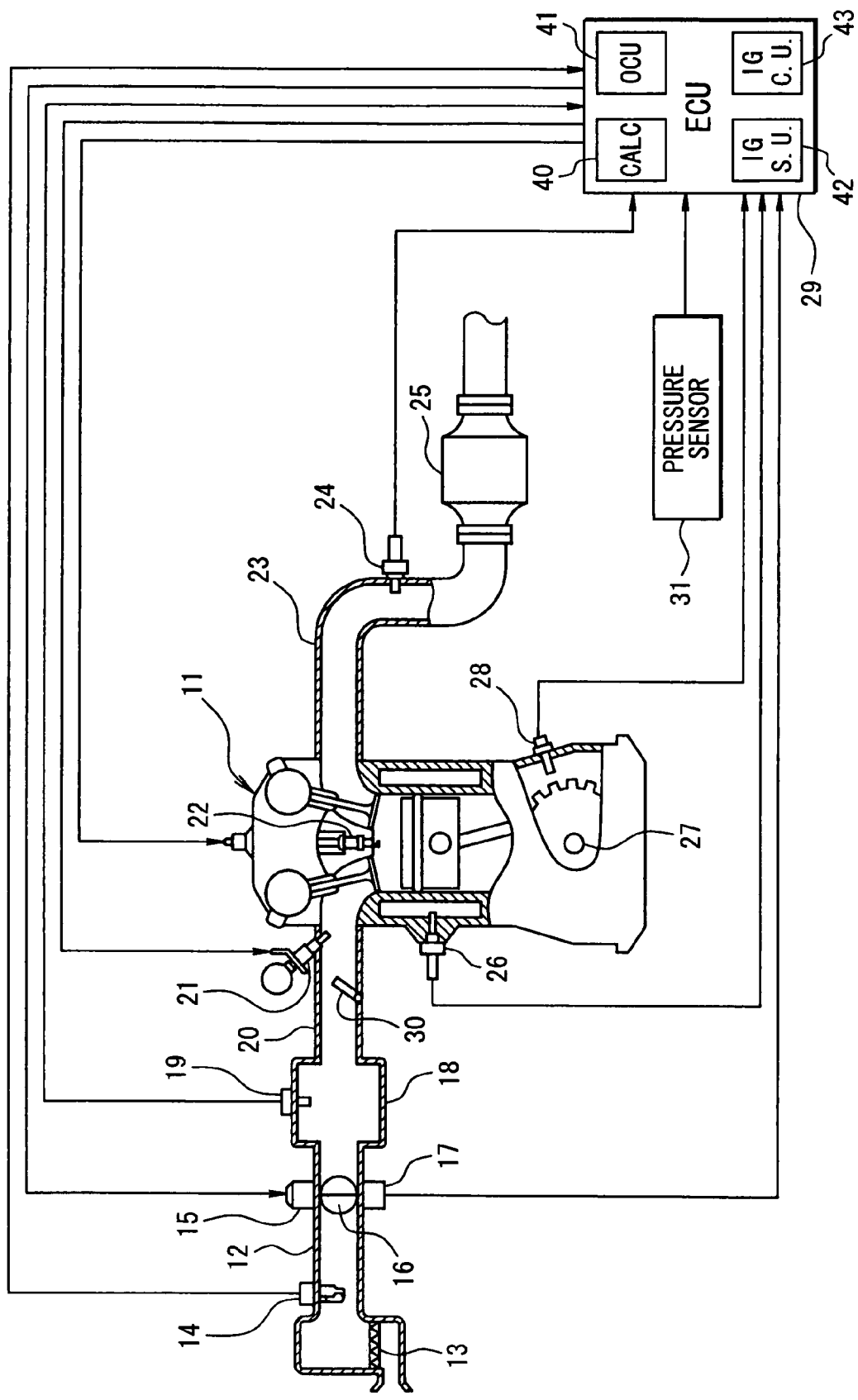
FIG. 1 is a schematic arrangement diagram showing one embodiment of an engine control system.

An embodiment in the present disclosure will be hereinafter described with reference to the accompanying drawings.

First, a schematic arrangement of an entire engine control system is described with reference to FIG. 1. An air cleaner 13 is provided at the most upstream portion of an intake pipe 12 for an engine 11 (an internal combustion engine) and an air flow meter 14 for detecting an intake air amount is provided at the downstream side of the air cleaner 13. A throttle valve 16 and a throttle opening sensor 17 for detecting an opening (throttle opening) of the throttle valve 16 are provided at the downstream side of the air flow meter 14. The position (i.e. the opening) of the throttle valve 16 is adjusted by a motor 15.

Further, a surge tank 18 is provided at the downstream side of the throttle valve 16, and an intake pipe pressure sensor 19 for detecting an intake pipe pressure is operatively coupled to the surge tank 18. In addition, an intake manifold 20 for introducing air into each cylinder of the engine 11 is fluidly coupled to the surge tank 18, and an intake control valve 30 for adjusting a flow of the intake air and a fuel injector 21 for injecting fuel are attached in the vicinity of an intake port of the intake manifold 20 of each cylinder. In addition, a spark plug 22 is attached to a cylinder head of the engine 11 for each cylinder and a mixture in the cylinder is ignited by spark discharge of each spark plug 22.

On the other hand, an exhaust gas sensor 24 (air-fuel ratio sensor, oxygen sensor, or the like) for detecting an air fuel ratio or a rich/lean state of an exhaust gas is provided in an exhaust gas pipe 23 of the engine 11. A catalyst 25 such as a three-way catalyst for purifying the exhaust gas is provided at the downstream side of the exhaust gas sensor 24.

In addition, a cooling water temperature sensor 26 for detecting a cooling water temperature and a crank angle sensor 28 for outputting a pulse signal each time a crank shaft 27 of the engine 11 rotates by a predetermined crank angle are attached to a cylinder block of the engine 11. A crank angle and an engine rotational speed are detected based upon an output signal of the crank angle sensor 28.

Further, an in-cylinder pressure sensor 31 is operatively coupled at the cylinder head of the engine 11 for detecting an in-cylinder pressure for at least one cylinder. In one embodiment, there is a plurality of in-cylinder pressure sensors 31 for detecting in-cylinder pressure for each cylinder. In one embodiment, the in-cylinder pressure sensor 31 is operatively coupled with the spark plug 22, and in another embodiment, the in-cylinder pressure sensor 31 is separate from the spark plug 22 and is operatively coupled to the combustion chamber.

An output of each of the above various sensors is inputted to a control circuit 29 (hereinafter referred to as "ECU"). The ECU 29 includes a microcomputer and executes various engine control programs (not shown) stored in a ROM (memory medium) housed therein to control a fuel injection amount of the fuel injector 21 or ignition timing of the spark plug 22 in accordance with an engine operating condition.

More specifically, as is schematically shown in FIG. 1, the ECU 29 includes a gravity position calculator 40 for calculating a gravity position of a total heat generation amount for a combustion period based upon the in-cylinder pressure detected by the in-cylinder pressure detector 31. Furthermore, the ECU 29 includes an opening correcting unit 41 for correcting a position of the intake control valve 30 based upon the gravity position of the total heat generation amount calculated by the gravity position calculator 40. In addition, the ECU 29 includes an ignition timing setting unit 42 for setting ignition timing in accordance with a control mode of the intake control valve 30. Moreover, the ECU 29 includes an ignition timing correction unit 43 for correcting the ignition timing set by the ignition timing setting unit 42 based upon the gravity position of the total heat generation amount at the time of correcting the opening of the intake control valve based upon the gravity position of the total heat generation amount by the opening correcting unit 41. Each of these components will be described in greater detail below.

Figure 2:
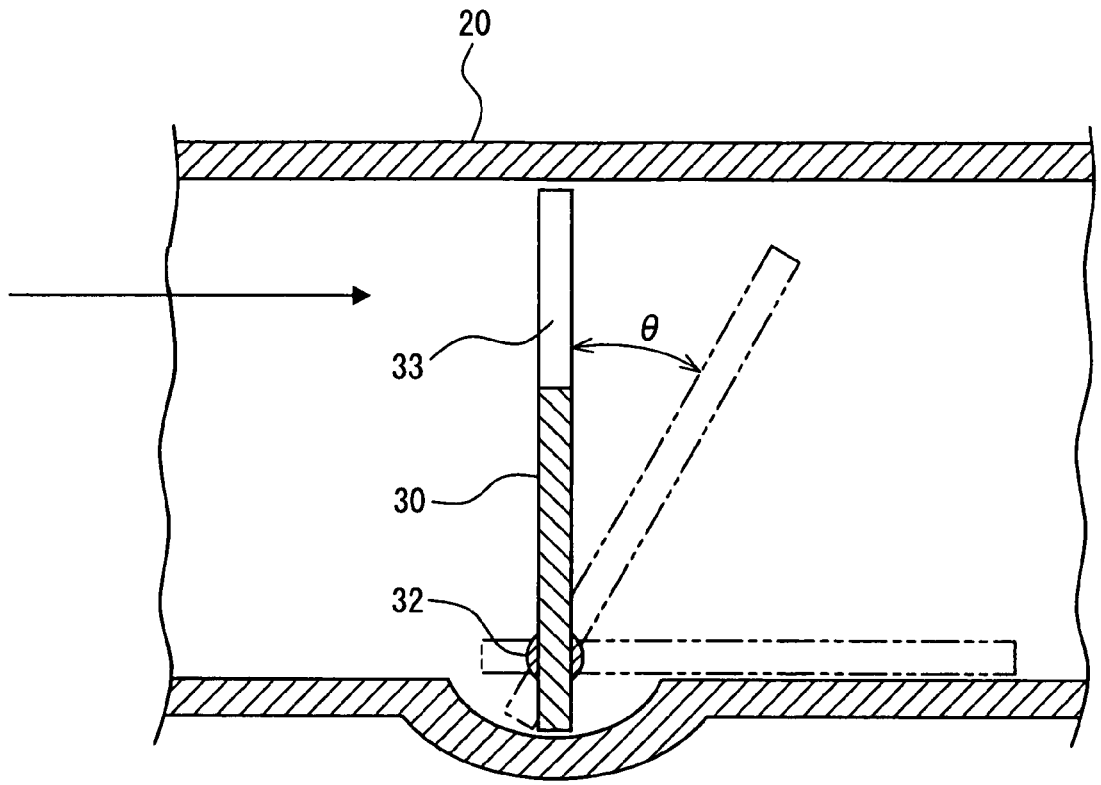
FIG. 2 is a longitudinal cross section of an intake control valve.

As shown in FIG. 2, each intake control valve 30 is coupled to a shaft 32. In the embodiment shown, the shaft 32 is connected to a lower end side of the corresponding intake control valve 30 and defines a rotational axis thereof. The shaft 32 is also rotationally coupled to a motor (not shown). By operating the motor, the intake control valve 30 is rotated about the axis of the shaft 32. Thus, the rotational position (i.e., the opening) of the intake control valve 30 is changed. Furthermore, in the embodiment shown, a notch portion 33 for generating a tumble flow inside the corresponding cylinder is formed in the upper portion of the intake control valve 30, so that as an opening of the intake control valve 30 gets smaller, a flow velocity of the intake air passing through the notch portion 33 of the intake control valve 30 increases to increase strength of the tumble flow inside the cylinder.

The ECU 29 executes an intake control valve control program (not shown) to control the rotational position (i.e., the opening) of the intake control valve 30. The intake control valve 30 is positioned in a plurality of positions in accordance with an engine operating condition. By way of example, FIG. 2 shows three of the positions of the intake control valve 30, one of which is illustrated with solid lines and two of which are illustrated with broken lines. Thereby, the strength of the tumble flow generated inside the cylinder is adjusted to stabilize the combustion state.

In the embodiment shown, the intake control valve 30 can be positioned in a fully closed position, a fully open position, and an intermediately open position. In the fully closed position, the intake control valve 30 is substantially perpendicular to the airflow (indicated by an arrow in FIG. 2). The fully closed position is illustrated with solid lines in FIG. 2. In the fully open position, the intake control valve 30 is substantially parallel to the airflow, and the fully open position is illustrated with broken lines in FIG. 2. In the intermediate position, the intake control valve 30 is positioned at an acute angle θ relative to the airflow, and the intermediate position is illustrated with broken lines in FIG. 2. The intake control valve 30 is positioned in the fully closed position during a low engine rotation/low engine load at engine startup. The intake control valve 30 is positioned in the fully open position during a high engine rotation/high engine load. During the other engine operating regions (i.e., intermediate engine rotation/intermediate engine load region), the intake control valve 30 is controlled to an intermediately open position to a predetermined angle θ.

When the flow velocity of the intake air passing through the notch portion 33 is reduced due to the opening variation of the intake control valve 30 to reduce the strength of the tumble flow inside the cylinder, the combustion state can deteriorate. Therefore, ECU 29 executes an intake control valve opening correction program shown in FIG. 6. When a predetermined correction execution condition is met in such a program, a gravity position of a total heat generation amount during a combustion period from a combustion start to a combustion finish is calculated based upon an in-cylinder pressure detected by the in-cylinder pressure sensor 31. In a case where the gravity position of the total heat generation amount is closer to a retard side than a target position, an opening of the intake control valve 30 is changed in the opening direction to reduce the flow velocity of the intake air passing through the notch portion 33, thereby reducing the strength of the tumble flow inside the cylinder. Therefore, it is determined that the gravity position of the total heat generation amount has changed closer to the retard side than the target position due to deterioration of the combustion state. Based upon such determination, the opening of the intake control valve 30 is corrected in the closing direction. Thus, the flow velocity of the intake air passing through the notch portion 33 is controllably increased to increase the strength of the tumble flow inside the cylinder, thereby optimizing the combustion state. On the other hand, in a case where the gravity position of the total heat generation amount is closer to the advance side than the target position, it is determined that an opening of the intake control valve 30 is varied in the closing direction. Based upon such determination, the opening of the intake control valve 30 is corrected in the opening direction.

Figure 3:
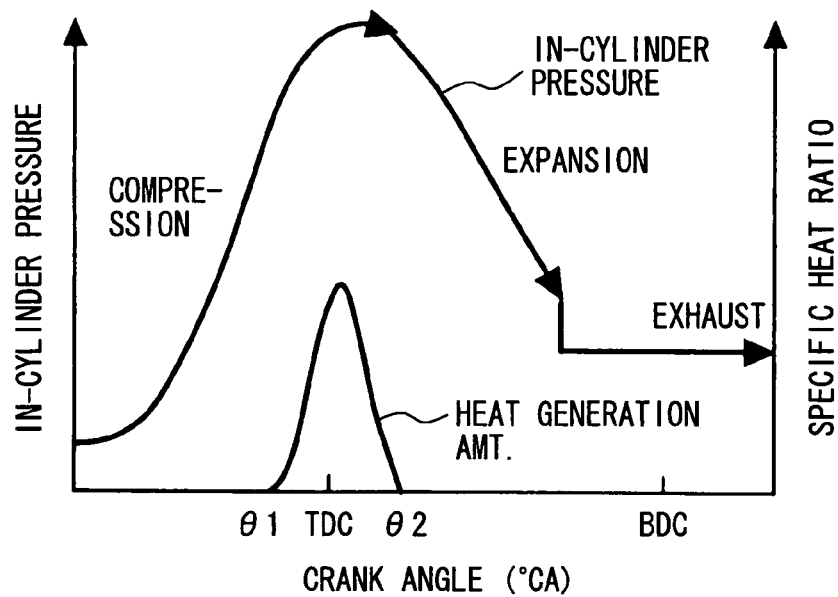
FIG. 3 is a time chart showing a relation between in-cylinder pressure and heat generation amount.

Here, a calculation method of a gravity position of a total heat generation amount will be explained with reference to FIGS. 3 to 5.

In general, a heat generation amount in a crank angle θ is calculated by the following formula:

Heat generation amount=$\{dP(\theta) \cdot V(\theta)+K \cdot P(\theta) \cdot dV(\theta)\}/(K-1)$ In this formula, the variable "K" corresponds to a ratio of specific heat, "P(θ)" corresponds to an in-cylinder pressure in crank angle (θ), "dP(θ)" corresponds to an in-cylinder pressure changing amount in crank angle (θ), "V(θ)" corresponds to a combustion chamber volume in crank angle (θ), and "dV(θ)" corresponds to combustion chamber volume changing amount in crank angle (θ).

Further, a total heat generation amount during a combustion period from a combustion start to a combustion finish is calculated according to the following formula:

Total heat generation amount=$\int$(heat generation amount)dθ

Figure 4:
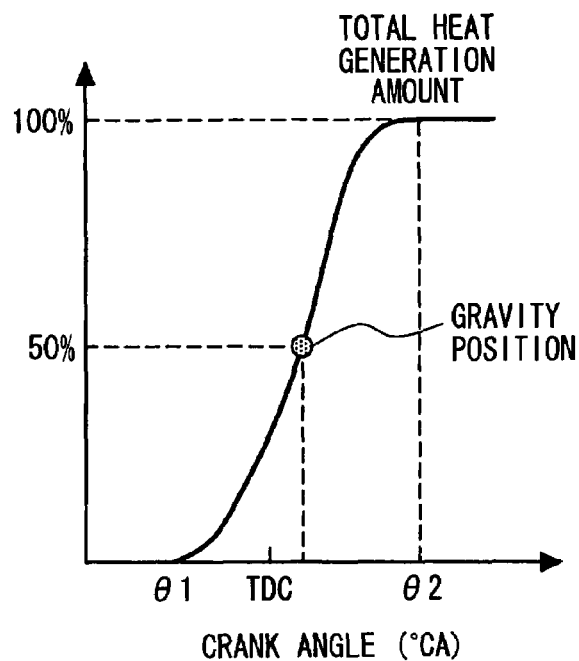
FIG. 4 is a time chart showing a relation between total heat generation amount and gravity position of the total heat generation amount.
Figure 5:
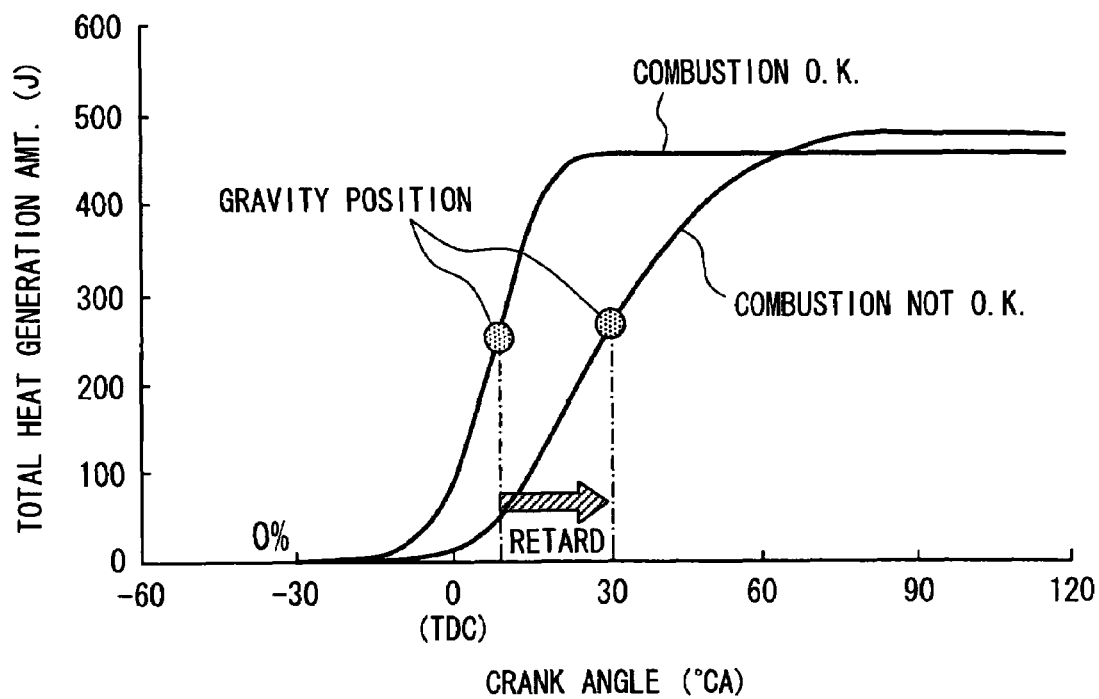
FIG. 5 is a time chart showing a relation between combustion state and gravity position of the total heat generation amount.

As shown in FIG. 4, in the embodiment a position corresponding to 50% of the total heat generation amount (i.e., a crank angle where a total heat generation amount from a combustion start reaches approximately 50% of the total heat generation amount from the combustion start to a combustion finish) is defined as a gravity position. It should be noted that the gravity position of the total heat generation amount is not limited to the position corresponding to 50% of the total heat generation amount and a predetermined position within a range from 10% to 90% of the total heat generation amount (for example, position corresponding to 40%, position corresponding to 45%, position corresponding to 55%, position corresponding to 60% or the like) may be defined as a gravity position of the total heat generation amount.

When a flow velocity of intake air passing through the notch portion 33 into the cylinder is reduced due to an opening variation of the intake control valve 30 to reduce strength of the tumble flow inside the cylinder, a combustion state in the cylinder deteriorates. In addition, as shown in FIG. 5, the combustion in the cylinder has the characteristic that when the combustion state deteriorates, a gravity position of a total heat generation amount changes in the retard direction. Therefore, the gravity position is used as a parameter for evaluating the combustion state and an opening variation of the intake control valve. Accordingly, when the opening of the intake control valve is corrected based upon the gravity position of the total heat generation amount, the opening variation of the intake control valve 30 is corrected to optimize the combustion state. Further, the gravity position remains in a nearly constant value regardless of an engine operating condition such as an engine rotational speed. Therefore, when the gravity position of the total heat generation amount is used to correct an opening of the intake control valve, it is possible to accurately correct the opening of the intake control valve 30 without influence of the engine operation condition.

In addition, ECU 29 executes an ignition timing setting program in FIG. 7, which will be described later, to calculate basic ignition timing A in accordance with an engine rotational speed and an engine load by using a map of an ignition timing corresponding to a control mode (for example, fully closed position control, intermediately opened position control or fully opened position control) of the intake control valve 30. When an opening of the intake control valve 30 is corrected based upon the gravity position of the total heat generation amount, an ignition timing correction amount B in accordance with the gravity position of the total heat generation amount is calculated and the basic ignition timing A is corrected by this ignition timing correction amount B to set a final ignition timing. In this way, when the opening of the intake control valve 30 is corrected based upon the gravity position of the total heat generation amount, the ignition timing is corrected in accordance therewith to be set to an appropriate value.

Hereinafter, the process content of the intake control valve opening correction program in FIG. 6 and the ignition timing setting program in FIG. 7 executed by ECU 29 will be explained.

[Intake Control Valve Opening Correction Program]

Figure 6:
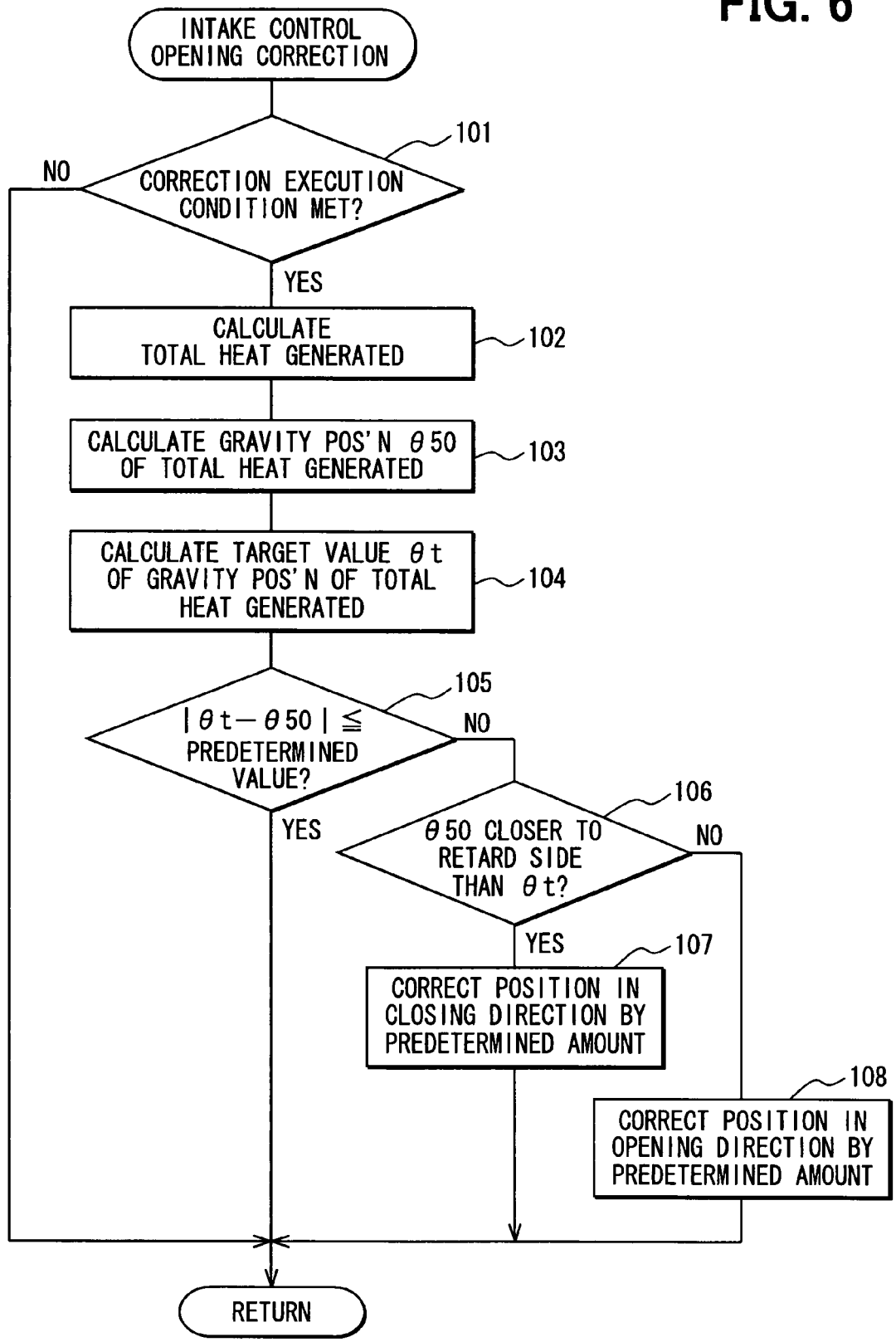
FIG. 6 is a flow chart showing the process of an opening correction program of an intake control valve.

The intake control valve opening correction program in FIG. 6 is executed in a predetermined cycle after ECU 29 turns on. When this program is activated, first at step 101 it is determined whether or not a correction execution condition is met. In one embodiment, the correction execution condition is determined to be met when the intake control valve 30 is controlled for intermediate opening and an engine rotational speed, a vehicle speed, an engine load, a cooling water temperature, an oil temperature and the like are respectively within a predetermined range (for example, at normal engine operating after the engine has warmed up).

In a case where it is determined at step 101 that the correction execution condition is not met, the steps with respect to the intake control valve opening correction subsequent to step 102 are not executed and this program ends.

On the other hand, in a case where it is determined at step 101 that the correction execution condition is met, the steps with respect to the intake control valve opening correction subsequent to step 102 are executed as follows. First at step 102, a total heat generation amount during a combustion period from a combustion start to a combustion finish is calculated.

Total heat generation amount=$\int$(heat generation amount)dθ

Thereafter, the process proceeds to step 103, wherein a gravity position θ50 of the total heat generation amount is calculated, which is a crank angle where the total heat generation amount from the combustion start reaches 50% of the total heat generation amount from the combustion start to the combustion finish. It is noted that an average value of the gravity position θ50 of the total heat generation amount within a predetermined period may be calculated.

Thereafter, the process proceeds to step 104, wherein by referring to a map of a target value θt of the gravity position of the total heat generation amount, the target value θt of the gravity position of the total heat generation amount is calculated in accordance with the present engine operating condition (that is, engine operating condition when the correction execution condition is met). The map of a target value θt of the gravity position of the total heat generation amount is produced in advance by determining an average value of the gravity position of the total heat generation amount for each engine operating condition in a case where the combustion state is appropriate. The map is stored in ROM in the ECU 29. It should be noted that the gravity position of the total heat generation amount is a nearly constant value regardless of an engine operating condition such as an engine rotational speed; therefore, the calculation processing may be simplified by employing a target value θt of the gravity position of the total heat generation amount as a fixed value.

Thereafter, the process proceeds to step 105, wherein it is determined whether or not the gravity position θ50 of the total heat generation amount corresponds to a target value θt of the gravity position of the total heat generation amount by determining whether an absolute value of a difference between the target value θt and the gravity position θ50 is less than or equal to a predetermined value.

As a result, in a case where the gravity position θ50 of the total heat generation amount does not correspond to the target value θt, the process proceeds to step 106, wherein it is determined whether or not the gravity position θ50 of the total heat generation amount is closer to the retard side than the target value θt.

In a case where it is determined at step 106 that the gravity position θ50 of the total heat generation amount is closer to the retard side than the target value θt, the position of the intake control valve 30 is varied in the opening direction to reduce the flow velocity of the intake air passing through the notch portion 33, reducing the strength of the tumble flow inside the cylinder. As a result, it is determined that the gravity position θ50 of the total heat generation amount is changed closer to the retard side than the target position θt due to deterioration of the combustion state, and the process goes to step 107, wherein the position of the intake control valve 30 is corrected in the closing direction by a predetermined correction amount (for example, 1 deg). Thereby, the flow velocity of the intake air passing through the notch portion 33 is controlled to increase the strength of the tumble flow inside the cylinder, thereby optimizing the combustion state.

On the other hand, in a case where it is determined at step 106 that the gravity position θ50 of the total heat generation amount is closer to the advance side than the target position θt, it is determined that an opening of the intake control valve 30 is varied in the closing direction, and the process goes to step 108, wherein the opening of the intake control valve 30 is corrected in the opening direction by a predetermined correction amount (e.g., 1 deg).

Thereafter, in a case where it is determined at step 105 that the gravity position θ50 of the total heat generation amount corresponds nearly to the target value θt, the opening of the intake control valve 30 corresponds nearly to a target opening (for example, 40 degrees) during intermediate opening controlling and the combustion state is an appropriate state. For this reason, it is determined that it is not required to correct the opening of the intake control valve 30, and the present program ends.

It should be noted that in the embodiment, in a case where it is determined that the gravity position of the total heat generation amount is closer to the retard side (or advance side) than the target position, the opening of the intake control valve 30 is corrected by a predetermined correction amount. However, in a case where it is determined that the gravity position of the total heat generation amount is closer to the retard side (or advance side) than the target position, a correction amount is set based upon a deviation between the gravity position of the total heat generation amount and the target position, and the opening of the intake control valve 30 may be corrected by the correction amount.

[Ignition Timing Setting Program]

Figure 7:
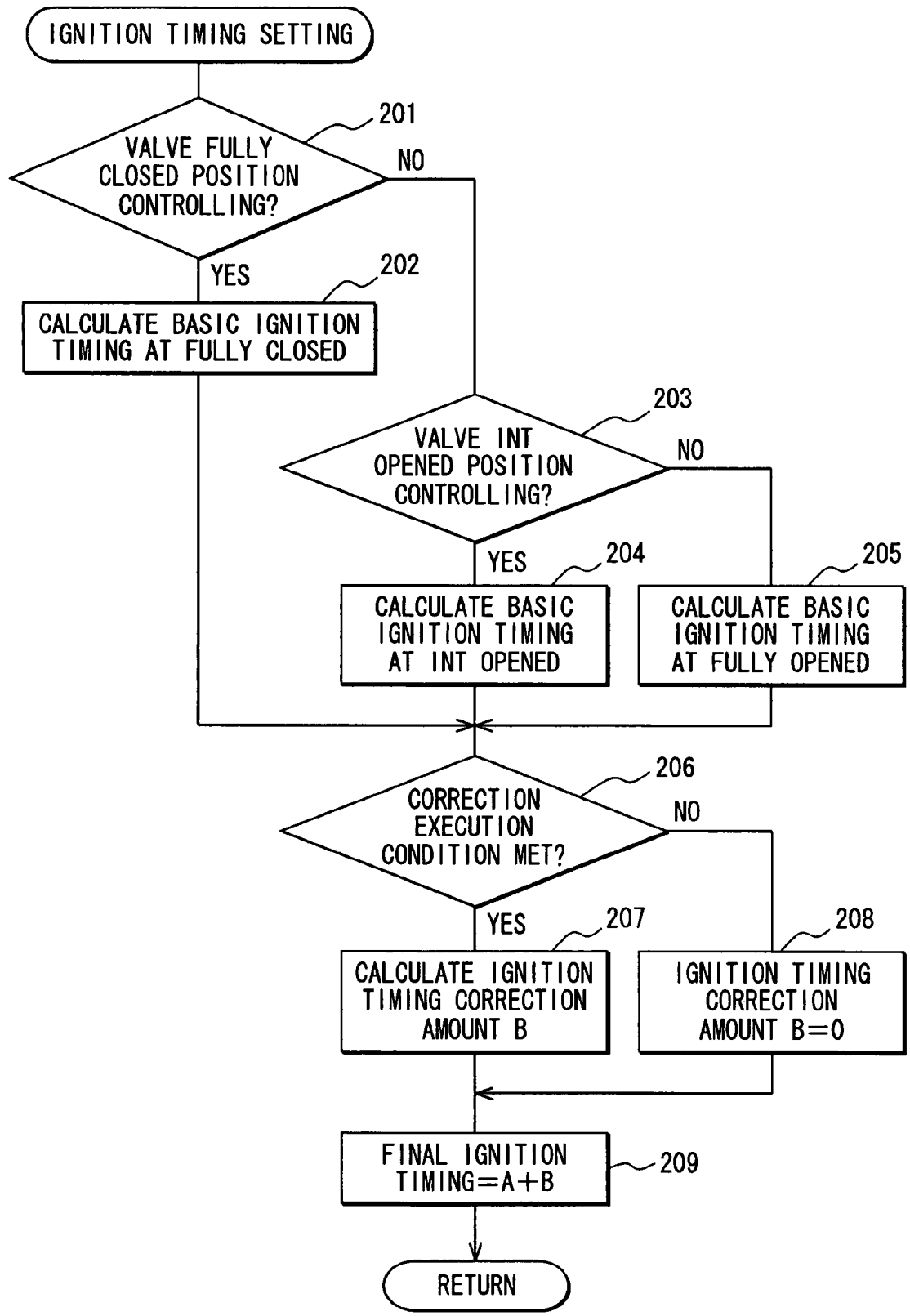
FIG. 7 is a flow chart showing the process of an ignition timing setting program.

The ignition timing setting program in FIG. 7 is executed in a predetermined cycle after ECU 29 turns on. First, in step 201 it is determined whether the intake control valve 30 is operating at fully closed position controlling. In a case where it is determined at step 201 that the intake control valve 30 is operating during fully closed position controlling, the process proceeds to step 202, wherein by referring to a map of ignition timing at a fully closed position of the intake control valve, a basic ignition timing A in accordance with an engine rotational speed and an engine load is calculated.

On the other hand, in a case where at step 201 it is determined that the intake control valve 30 is not operating at fully closed position controlling, the process proceeds to step 203, wherein it is determined whether the intake control valve 30 is operating at intermediately opened position controlling. In a case where it is determined at step 203 that the intake control valve 30 is operating during intermediately opened position controlling, the process proceeds to step 204, wherein by referring to a map of ignition timing at an intermediately opened position of the intake control valve, a basic ignition timing A in accordance with an engine rotational speed and an engine load is calculated.

Further, in a case where at step 201 it is determined that the intake control valve 30 is not operating at fully closed position controlling, and also at step 203 it is determined that the intake control valve 30 is not operating at intermediately opened position controlling, it is determined that the intake control valve 30 is operating at fully opened position controlling, and the process proceeds to step 205, wherein by referring to a map of ignition timing at a fully opened position of the intake control valve, a basic ignition timing A in accordance with an engine rotational speed and an engine load is calculated.

Thereafter, the process proceeds to step 206, wherein it is determined whether the correction execution condition is met similar to step 101 in FIG. 6. In other words, it is determined whether the opening of the intake control valve 30 is corrected based upon the gravity position of the total heat generation amount.

In a case where it is determined at step 206 that the correction execution condition is met (i.e., the opening of the intake control valve 30 is corrected based upon the gravity position of the total heat generation amount), the process proceeds to step 207, wherein by referring to a map of the ignition timing correction amount B shown in FIG. 8, the ignition timing correction amount B in accordance with the gravity position θ50 of the total heat generation amount is calculated.

On the other hand, in a case where it is determined at step 206 that the correction execution condition is not met (i.e., the opening of the intake control valve 30 is not corrected based upon the gravity position of the total heat generation amount), the process proceeds to step 208, wherein the ignition timing correction amount B is set to "0".

Thereafter, the process proceeds to step 209, wherein the ignition timing correction amount B is added to the basic ignition timing A to correct the basic ignition timing A with the ignition timing correction amount B, thus determining a final ignition timing. Thereby, when the opening of the intake control valve 30 is corrected based upon the gravity position θ50 of the total heat generation amount, the ignition timing is corrected in accordance therewith to set the ignition timing to an appropriate value.

Figure 9:
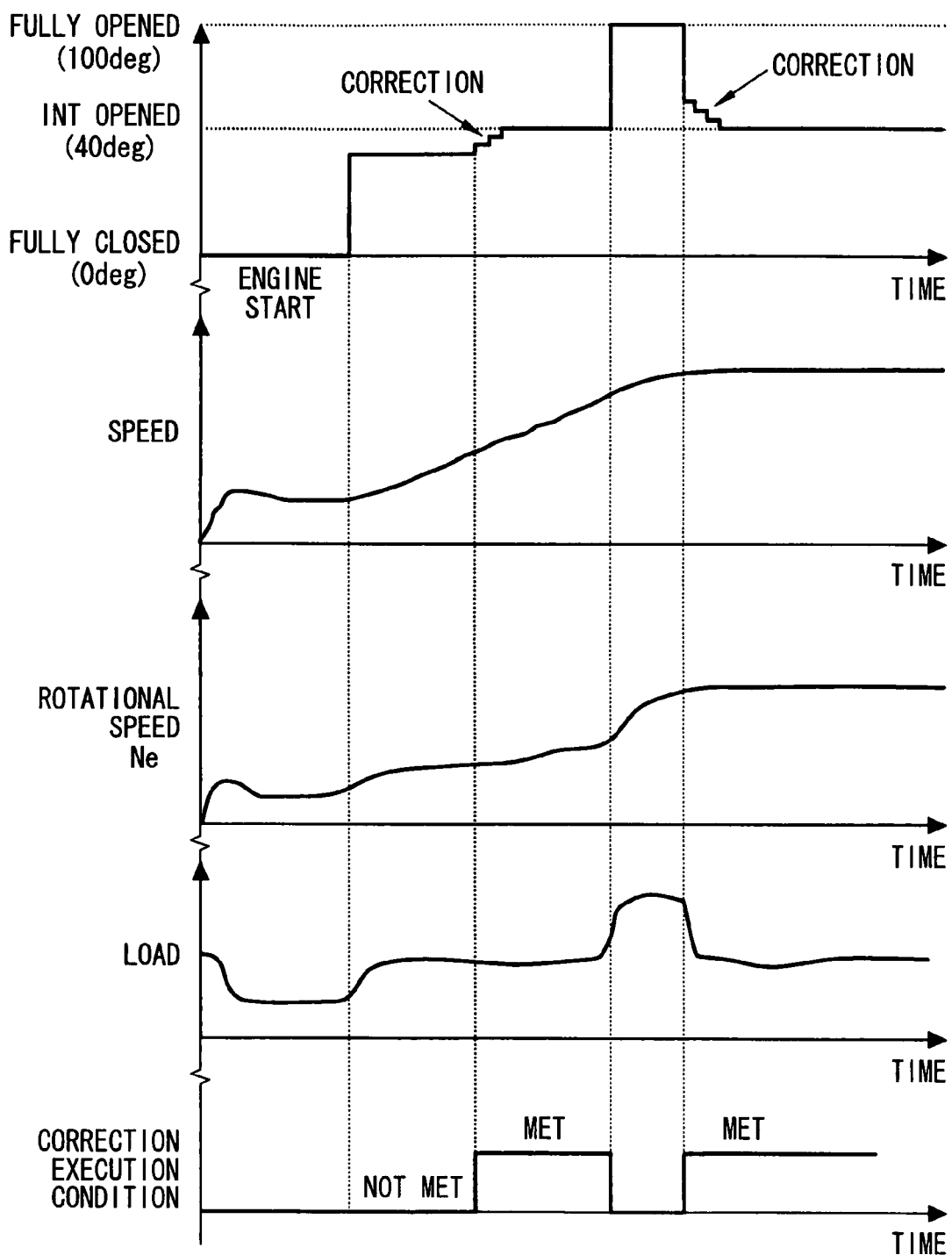
FIG. 9 is a time chart showing an embodiment of an intake control valve opening correction.

In the embodiment described above, as shown in a time chart in FIG. 9, when a predetermined correction execution condition is met during intermediately opened position controlling of the intake control valve 30, a gravity position of a total heat generation amount during a combustion period from a combustion start to a combustion finish is calculated, comparing the gravity position of the total heat generation amount with a target position. In addition, in a case where it is determined that the gravity position of the total heat generation amount is closer to the advance side than the target position, it is determined that an opening of the intake control valve 30 is varied in the closing direction, and the opening of the intake control valve 30 is corrected in the opening direction.

In addition, in a case where it is determined that the gravity position of the total heat generation amount is closer to the retard side than the target position, since an opening of the intake control valve 30 is varied in the opening direction, it is determined that the gravity position of the total heat generation amount is closer to the retard side than the target position due to deterioration of the combustion state. For this reason, the opening of the intake control valve 30 is corrected in the closing direction. As a result, the strength of the tumble flow inside the cylinder is increased to optimize the combustion state.

Since the gravity position of the total heat generation amount becomes a parameter for evaluating the combustion state, furthermore the opening variation of the intake control valve 30, when the opening of the intake control valve 30 is corrected based upon the gravity position of the total heat generation amount as in the case of the embodiment, the opening variation of the intake control valve is corrected, making it possible to optimize the combustion state. Further, the gravity position of the total heat generation amount remains in a nearly constant value regardless of an engine operating condition such as an engine rotational speed. Therefore, when the gravity position of the total heat generation amount is used to correct an opening of the intake control valve 30, even if the engine operating condition is not used, it is possible to accurately correct the opening of the intake control valve without influence of the engine operation condition, enabling a reduction in calculation load of ECU 29.

In addition, in the embodiment, the ignition timing is corrected based upon the ignition timing correction amount in accordance with the gravity position of the total heat generation amount at the time of correcting the opening of the intake control valve 30 based upon the gravity position of the total heat generation amount. As a result, when the opening of the intake control valve 30 is corrected based upon the gravity position of the total heat generation amount, the ignition timing is corrected in accordance therewith, making it possible to set the ignition timing at an appropriate value.

It should be noted that the present disclosure is applied to the above embodiment of employing a system provided with an intake control valve for controlling a tumble flow, but is not limited to this and can be applied widely to a system provided with an intake control valve adjusting a flow of intake air for improving the combustion state, such as an intake control valve for controlling a swirl flow or an intake control valve for controlling both a swirl flow and a tumble flow.

In addition, the present disclosure is applied to the above embodiment of employing a system for switching an opening of the intake control valve in three stages, but may be applied to a system for switching an opening of the intake control valve in two stages, four stages or more. Further, the present disclosure may be applied to a system for successively varying an opening of the intake control valve 30.

While only the selected example embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the example embodiments according to the present disclosure is provided for illustration only, and not for the purpose of limiting the disclosure as defined by the appended claims and their equivalents.

What is claimed is:

1. A controller for an internal combustion engine which includes an intake control valve adjusting a flow of intake air in the internal combustion engine and controls a position of the intake control valve in accordance with an engine operating condition comprising:
    an in-cylinder pressure detector for detecting an in-cylinder pressure in the internal combustion engine;
    a gravity position calculator for calculating a gravity position of a total heat generation amount during a combustion period based upon the in-cylinder pressure detected by the in-cylinder pressure detector; and
    an opening correcting unit for correcting a position of the intake control valve based upon the gravity position of the total heat generation amount calculated by the gravity position calculator.

2. A controller for an internal combustion engine according to claim 1, wherein the gravity position calculator calculates a predetermined position within a range of 10% to 90% in the total heat generation amount during the combustion period from a combustion start to a combustion finish as the gravity position of the total heat generation amount.

3. A controller for an internal combustion engine according to claim 2, wherein the gravity position calculator calculates a position corresponding to 50% in the total heat generation amount during the combustion period from the combustion start to the combustion finish as the gravity position of the total heat generation amount.

4. A controller for an internal combustion engine according to claim 1, wherein when the intake control valve is controlled to a predetermined position, in a case where the gravity position of the total heat generation amount is closer to a retard side than a target position, the opening correcting unit corrects the position of the intake control valve in the closing direction, and in a case where the gravity position of the total heat generation amount is closer to an advance side than the target position, the opening correcting unit corrects the position of the intake control valve in the opening direction.

5. A controller for an internal combustion engine according to claim 1, further comprising:
    an ignition timing setting unit for setting ignition timing in accordance with a control mode of the intake control valve; and
    an ignition timing correction unit for correcting the ignition timing set by the ignition timing setting unit based upon the gravity position of the total heat generation amount at the time of correcting the opening of the intake control valve based upon the gravity position of the total heat generation amount by the opening correcting unit.

6. A process for controlling an intake control valve of an internal combustion engine that adjusts a flow of intake air in the internal combustion engine comprising:
    detecting an in-cylinder pressure in the internal combustion engine;

calculating a gravity position of a total heat generation amount during a combustion period based upon the detected in-cylinder pressure; and correcting a position of the intake control valve based upon the calculated gravity position of the total heat generation amount.

7. A process for controlling an intake control valve according to claim 6, wherein calculating the gravity position of the total heat generation amount comprises calculating a predetermined position within a range of 10% to 90% in the total heat generation amount during the combustion period from a combustion start to a combustion finish as the gravity position of the total heat generation amount.

8. A process for controlling an intake control valve according to claim 7, wherein calculating the gravity position of the total heat generation amount comprises calculating a position corresponding to 50% in the total heat generation amount during the combustion period from the combustion start to the combustion finish as the gravity position of the total heat generation amount.

9. A process for controlling an intake control valve according to claim 6, wherein, when the intake control valve is controlled to a predetermined position, in a case where the gravity position of the total heat generation amount is closer to a retard side than a target position, correcting the position of the intake control valve comprises correcting the position of the intake control valve in the closing direction, and in a case where the gravity position of the total heat generation amount is closer to an advance side than the target position, correcting the position of the intake control valve comprises correcting the position of the intake control valve in the opening direction.

10. A process for controlling an intake control valve according to claim 6, further comprising:

setting ignition timing in accordance with a control mode of the intake control valve; and correcting the set ignition timing based upon the gravity position of the total heat generation amount at the time of correcting the opening of the intake control valve based upon the gravity position of the total heat generation amount.

* * * * *